Jan. 15, 1957  S. MEURER  2,777,430
METHOD FOR INJECTING WATER INTO THE COMBUSTION
CHAMBER OF HIGH SPEED DIESEL ENGINES
Filed July 22, 1955  2 Sheets-Sheet 1

INVENTOR
Siegfried Meurer
BY
Bailey, Stephens & Huettig
ATTORNEYS

Jan. 15, 1957  S. MEURER  2,777,430
METHOD FOR INJECTING WATER INTO THE COMBUSTION
CHAMBER OF HIGH SPEED DIESEL ENGINES
Filed July 22, 1955  2 Sheets-Sheet 2

INVENTOR

Siegfried Meurer

BY Bailey, Stephens & Huettig
ATTORNEYS

United States Patent Office 2,777,430
Patented Jan. 15, 1957

2,777,430

METHOD FOR INJECTING WATER INTO THE COMBUSTION CHAMBER OF HIGH SPEED DIESEL ENGINES

Siegfried Meurer, Nurnberg, Germany, assignor to Maschinenfabrik Augsburg-Nurnberg, A. G., Nurnberg, Germany Application July 22, 1955, Serial No. 523,914

5 Claims. (Cl. 123—25)

This invention relates to a method for injecting water into high speed diesel engines. In particular, the invention is directed to a method of injecting water into the combustion chamber of a diesel-type engine in which substantially all the fuel is first deposited as a liquid film upon the wall of the combustion chamber, and then vaporized from said wall, and burned. Such an engine is described in the co-pending application of Meurer et al., Serial No. 480,432, filed January 17, 1955, for "Operation of Internal Combustion Engines."

It is well known that an improvement in the combustion in a diesel engine is obtained by injecting water into the combustion chamber. This is because active oxygen is released in the decomposition of the water vapor, and this additional oxygen inhibits the formation of carbon. Although this advantage is desirable, it is offset by the disadvantage of a reduced temperature in the combustion chamber being occasioned by the heat of vaporization of the water, which interferes with the ignition of the gases. The greatest difficulty lies in the fact that adequate results require that, in order to avoid the formation of soot or carbon in the combustion chamber, a considerable quantity and concentration of water vapor is required in the combustion chamber. As more water is introduced, the more the temperature in the combustion chamber is lowered, and the advantage of adding water becomes a disadvantage before the optimum effect of the presence of water can be achieved.

The objects of the instant invention are to introduce an optimum quantity of water vapor into the combustion chamber without detrimentally lowering the temperature of the combustion gases, and to obtain a smoothly running engine by preventing a too early decomposition of the fuel during the combustion process in the engine.

According to this invention substantially all the fuel is first applied to the wall of the combustion chamber, from which the fuel is evaporated, as set forth in the aforesaid application, Serial No. 480,432. Due to the length of time the fuel film is in contact with the hot wall of the combustion chamber, the last portion of the fuel to be evaporated will undergo at least some decomposition before being evaporated, and the decomposition products are those which form carbon and coke-like residues. Such decomposition is stopped in this invention by injecting water into the combustion chamber according to the principles set forth in application Serial No. 480,432, while at the same time the advantages of the addition of water are obtained.

Accordingly, the water is not directly mixed with the combustion gases as done heretofore, but the fuel is injected through one or more nozzles as a jet to form a film of water on the wall of the combustion chamber, from which it is evaporated. The water injection nozzle, or nozzles, mounted above the circumference of the combustion chamber, are offset with respect to the fuel nozzle, and the water film on the combustion chamber wall is offset from the fuel film on the wall. In this manner, the water has sufficient time to evaporate so that the water vapor flows over the fuel film which is also being vaporized. This serves to keep the fuel film relatively cool, and below its decomposition point as the fuel is being vaporized. At the same time, an advantage is obtained because the heat for vaporizing the water film is taken from the metal of the piston, rather than from the combustion gases, and thus undesirable heat losses are avoided.

A vigorous air swirl in the combustion chamber, created in engines of the type considered herein, prevents the injected water from being initially diffused through the combustion gases. Rather, the water is deposited as a film, or films, which lie side by side, and at least partially surround the film of fuel. Accordingly, the water films can be placed where they are most desired to avoid local overheating of the fuel film, and in some instances, the water film can be merged with the fuel film over certain areas.

The invention is more fully described with reference to the accompanying drawings, in which.

Figure 1:
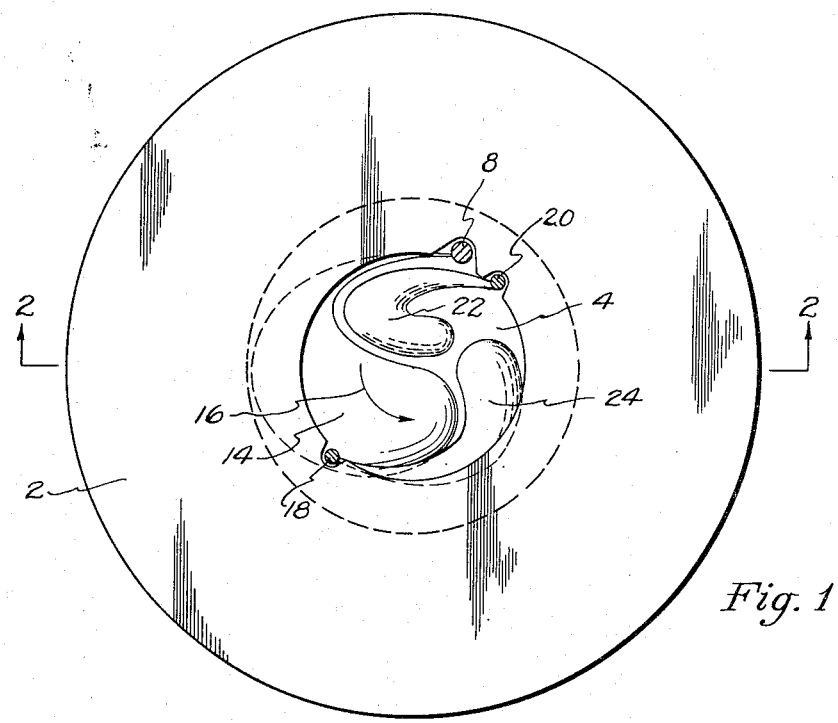
Figure 1 is a top plan view of a piston head having a combustion chamber and fuel and water nozzles positioned above said chamber.
Figure 2:
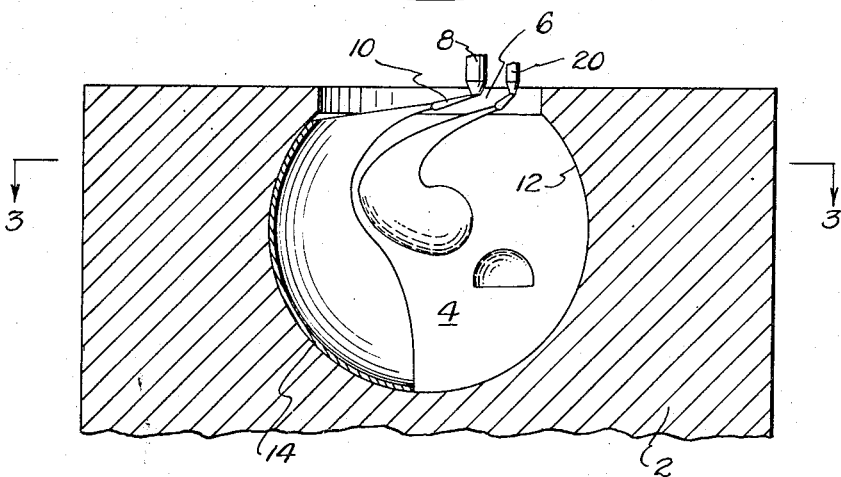
Figure 2 is a cross-sectional view on the line 2—2 of Figure 1.
Figure 3:
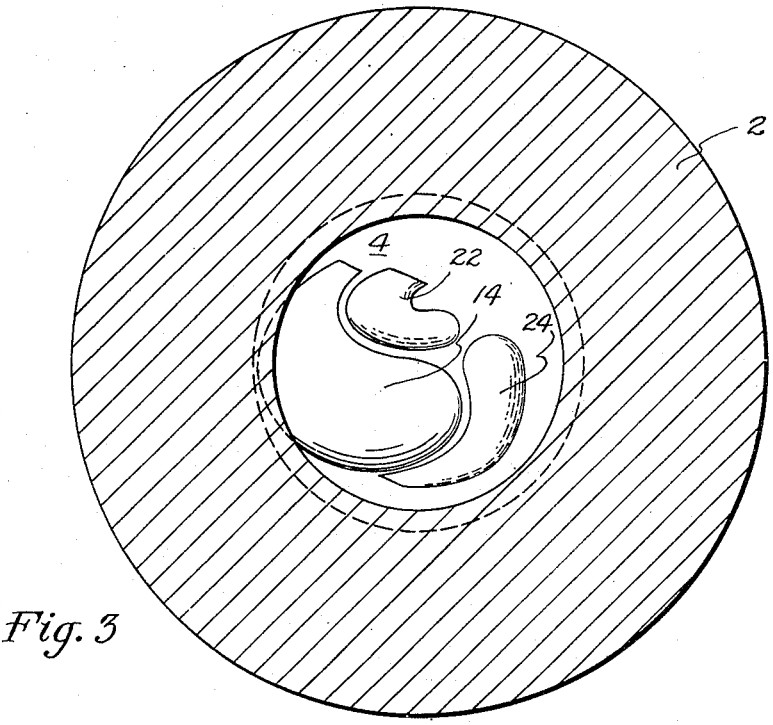
Figure 3 is a cross-sectional view on the line 3—3 of Figure 2.

The head of the piston 2 has a combustion chamber 4. At the mouth 6 of the combustion chamber is a fuel nozzle 8 from which a jet or jets of fuel emerge and strike against the wall 12 of the combustion chamber, from which a film of fuel 14 is spread along the wall of the combustion chamber. This film takes a rather helical form as it is spread by a swirl of air moving in the direction indicated by the arrow 16, and flows toward the lower point of the combustion chamber.

Water injection nozzles 18 and 20 at the mouth 6 of the combustion chamber are offset from fuel nozzle 8, and are so positioned so as to emit jets of water directed against the wall 12 of the combustion chamber, from which point films of water 22 and 24 are spread by the swirling air over the wall 12 of the combustion chamber. These films of water at least partially surround the fuel film 14.

Figure 4:
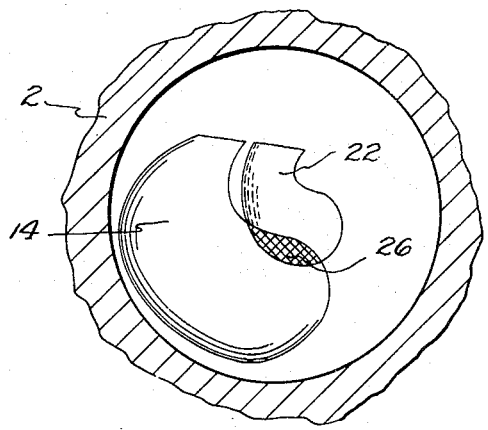
Figure 4 is a modified form of the invention shown in Figure 3.

As shown in Figure 4, it is sometimes desirable to have fuel film 14 and one or more parts of the water films merged over an area 26 in order to take care of particular conditions occasioned, for example, by the type of fuel used. Thus, when using a fuel having a low boiling point, it is possible that the fuel will be evaporated faster than desired from hot spots on the wall of the combustion chamber. Here it is advisable to lap or merge the water film with the fuel film over the hot spots in order to cool the fuel. On the other hand, when fuels having a high boiling point are used, it is possible that the catalyzing effect of the vaporized water swirled over the fuel film is not enough to ensure that the fuel will vaporize before coking. By lapping or merging the fuel and water films, the catalyzing effect of the vaporizing water film can hinder such coking over the merged area.

Having now described the means by which the objects of the invention are obtained,

I claim:

1. A method of injecting water into the combustion chamber of a diesel-type engine in which substantially all the fuel is first deposited as a film on the wall of the combustion chamber and then vaporized and burned, comprising injecting water in the combustion chamber to form a water film thereon, and then vaporizing said water film from said wall.

2. A method of injecting water as in claim 1, further comprising forming a water film adjacent to and separate from said fuel film.

3. A method of injecting water as in claim 1, further comprising forming a water film at least partially merged with said fuel film.

4. A method as in claim 1, further comprising forming a plurality of films of water on the combustion chamber wall with said films at least partially surrounding said fuel film.

5. A diesel-type engine comprising a cylinder, a piston forming a combustion chamber in said cylinder, means for forming a film of fuel on the wall of the combustion chamber, and means for forming a film of water on said wall adjacent said fuel film.

References Cited in the file of this patent

UNITED STATES PATENTS

| | | |
|---|---|---|
| 1,727,860 | Carlson | Sept. 10, 1929 |
| 2,218,522 | Butler | Oct. 22, 1940 |